United States Patent [19]

Economy et al.

[11] 3,993,442

[45] Nov. 23, 1976

[54] ANIONIC DYEING OF NOVOLOID FIBERS

[75] Inventors: James Economy, Eggertsville; George Y. Lei, Williamsville, both of N.Y.

[73] Assignee: The Carborundum Company, Niagara Falls, N.Y.

[22] Filed: Sept. 19, 1974

[21] Appl. No.: 507,315

[52] U.S. Cl. .......... 8/173; 8/4; 8/42 R; 8/162 R; 260/38

[51] Int. Cl.² .......... D06P 3/58

[58] Field of Search .......... 8/42, 54, 4, 162, 173; 260/38

[56] References Cited

UNITED STATES PATENTS

| | | | |
|---|---|---|---|
| 2,524,811 | 10/1950 | Koberlein | 8/4 |
| 3,511,827 | 5/1970 | Horning | 8/42 |
| 3,716,521 | 2/1973 | Economy et al. | 260/59 |
| 3,808,289 | 4/1974 | Okubashi et al. | 260/841 |
| 3,829,287 | 8/1974 | Litke | 8/42 |
| 3,927,973 | 12/1975 | Ida et al. | 8/173 |

FOREIGN PATENTS OR APPLICATIONS

| | | | |
|---|---|---|---|
| 856,381 | 12/1960 | United Kingdom | 8/54 |

*Primary Examiner*—Donald E. Czaja
*Assistant Examiner*—S. M. Person
*Attorney, Agent, or Firm*—David E. Dougherty; Raymond W. Green

[57] ABSTRACT

Compositions are disclosed for dyeing cross-linked novolac fibers, and blends thereof, using anionic dyes and premetallized dyes.

19 Claims, No Drawings

ANIONIC DYEING OF NOVOLOID FIBERS

BACKGROUND OF THE DISCLOSURE

The present invention relates to dyeing of cross-linked phenolic resin fibers and blends thereof, using anionic or premetallized dyes.

Novoloids, infusible cured phenolic resins containing at least 85 percent cross-linked novolac, may be produced by fiberization of a novolac melt and subsequent cross-linking or curing to an infusible stage. Curing may be effected in the presence of a source of methylene groups, such as paraformaldehyde, formaldehyde, or hexamethylenetetramine, and preferably also in the presence of an acidic or basic catalyst. Such novoloid fibers are disclosed in the following U.S. Patents, which are incorporated herein by reference: U.S. Pat. No. 3,650,102, issued Mar. 21, 1972, to Economy et al.; U.S. Pat. No. 3,716,521, issued Feb. 13, 1973, to Economy et al.; and U.S. Pat. No. 3,723,588, issued Mar. 27, 1973, to Economy et al. Novoloid fibers may be formed into felts, mats, cloths, rovings, or other useful embodiments in accordance with conventional fiber handling techniques. A fabric of such fibers is disclosed by U.S. Pat. No. 3,628,995, issued Dec. 21, 1971, to Economy et al.

Novoloid fibers have a number of highly desirable attributes which render them of value in numerous applications. Their most outstanding virtue is excellent flame resistance. When subjected to flame, the infusible fibers do not melt, but rather char to produce carbon fibers, which continue to retain the shape and approximate dimensions of the original fibers, and which continue to afford extremely effective protection from flames. Accordingly, the fibers are of great utility in the fabrication of flame-protective clothing, as well as drapes, carpeting, upholstery, and the like which are especially suited for use in areas where fire constitutes a particular hazard. Such fibers also provide very effective thermal and accoustical insulation, and again are particularly useful for these applications where fire is a hazard. The fibers have suitable mechanical properties, such as tenacity and break elongation, to permit their being processed into yarns, woven and knitted fabrics and the like, as well as various non-woven forms such as felt, batting, and paper.

Notwithstanding such desirable attributes, infusible cured phenolic resin fibers have several disadvantages. Just after curing, they are generally quite intensely colored, the hue ranging from very pale yellow to gold. Moreover, upon standing, the coloration may increase considerably in intensity, becoming deep brown or reddish brown. Thus, the fibers are known to possess rather poor color fastness.

Such novoloid fibers are particularly resistant to normal commercial dyeing processes. Accordingly, it has been difficult to obtain fibers and/or fabrics of the desired range of colors and color fastness. This detriment has a marked effect upon their acceptance by the textile industry and by the consumer with respect to applications for such fibers and fabrics in which color is an important factor.

In an attempt to overcome the deep coloration of such fibers, esterification or etherification of the phenolic hydroxyl groups may be utilized. In accordance with U.S. Pat. No. 3,716,521, of Economy et al., infusible cured phenolic resin fibers may be reacted with any of a wide variety of suitable esterification or etherification reagents, at a suitable temperature, for sufficient time to block at least about 50 percent, and preferably about 90 percent, of the phenolic hydroxyl groups of the cured resin. The blocking of phenolic hydroxyl groups may be accomplished after the resin has been cured to the point of infusibility, notwithstanding the cross-linked nature of the resin. Such fibers, while generally white in color and quite colorfast, have also, in the past, been difficult to dye to desired shades using commercially acceptable dyeing processes.

Acid, or anionic dyes, contain as the active principle aromatic compounds including in their structure both a chromophoric group and a water-solubilizing group. Usually the solubilizing group is the sulfonic acid radical, $-SO_3H$. The commercial dyes appear in the form of the sodium salt, normally diluted to a standard effective concentration with anhydrous sodium sulfate. Typical chemical structures found in anionic dyes include nitro, monoazo, diazo, triphenyl-methane, anthraquinone, azine, and quinoline.

One class of anionic dyes is the premetallized acid dye. These dyes may be 1:1 or 1:2 metal complex dyes, containing one metallic atom for each one or two dye molecules. Usually the dye molecule is an azo type or an azomethine, while the metal in most instances is chromium, cobalt, or iron. Both anionic and premetallized dyes have been successfully used for dyeing wool and silk fibers, giving excellent fastness. However, they have not been successfully used for dyeing phenolic fibers, and novoloid fibers in particular, prior to the present invention.

SUMMARY OF THE INVENTION

In accordance with the present invention infusible cured phenolic resin fibers, and blends thereof, may be subjected to commercial scale dyeing processes utilizing anionic and premetallized dyes. The invention comprises a dyeing formulation preferably comprising from about five to about 7.5 percent dye (based on fiber weight), at least about 6 percent benzyl alcohol or five percent benzyl alcohol/acetophenone dye carrier, one percent formic acid, and one percent acetic acid. The use of the proper proportions of formic acid and dye carrier are considered critical for promoting dye exhaustion.

DESCRIPTION OF PREFERRED EMBODIMENTS

Exemplary of infusible phenolic resins considered suitable for dyeing in accordance with the present invention are those set forth by U.S. Pat. No. 3,650,102, of Economy et al. Cross-linked novolac fibers of this nature have been granted the designation "Novoloid" by the U.S. Federal Trade Commission, and are available from The Carborundum Company of Niagara Falls, New York, under the Trademark KYNOL$^{tm}$. Such fibers are produced by the formation of a melt of a fusible novolac which is capable of cross-linking in the presence of a suitable aldehyde, fiberization of said melt to form thermoplastic fusible fibers, and cross-linking thereof by heating in the presence of methylene groups to render them infusible.

Other suitable fibers include the aforementioned esterified or etherified resin fibers as prepared in accordance with U.S. Pat. No. 3,716,521, of Economy et al.

In addition, blends of those two infusible phenolic resin fibers may be dyed in accordance with the present invention, as well as blends of an infusible phenolic resin fiber with a minor proportion of aromatic polyamide fibers. Suitable aromatic polyamides include various fibers, previously designated as nylon a preferred example being Nomex aramid, an aromatic polyamide available from E. I. DuPont de Nemours & Company. Blends of novoloid with up to 20 weight percent polyamide may be successfully subjected to dyeing in accordance with the present invention. While the polyamide fibers themselves are not strongly dyed by the dye baths of the present invention, the intense coloration of the novoloid fibers masks the weak coloration of a minor proportion of polyamide fiber.

The dyeing process of the present invention utilizes a dye carrier, formic acid, and acetic acid. As the dye carrier benzyl alcohol or a benzyl alcohol/acetophenone (80/20) blend are suitable. When using anionic dyes, benzyl alcohol is the preferred carrier, while benzyl alcohol/acetophenone (80/20) is preferred for premetallized dyes. When dyeing 100 percent novoloid, or blends of novoloid/polyamide, at least 3 percent carrier by volume is desirable, with a range of from about 3 to about 10 percent carrier being suitable.

The use of at least about 1 percent by volume, based on the dyeing bath, of formic acid has been found essential to the present invention. The formic acid may be present in a proportion of from about 1 to about 10 percent or higher, and is most conveniently added to the dye bath in the form of concentrated acid (i.e., 90 percent concentration or higher). However, concentrations greater than about 5 percent are not economically advantageous. In addition, about 1 percent to about 5 percent by volume of acetic acid is employed in the dye bath to promote dye exhaustion. This is conveniently added as a 56 percent solution with the formic acid.

In addition, the use of a small amount, i.e., less than 0.1 weight percent, of a surface active agent is advantageous as a wetting agent. Various organic derivatives such as sodium salts of high molecular weight alkyl sulfates or sulfonates may be used, with about 0.04 percent by weight of Merpol SE surface active agent, available from E. I. duPont de Nemours & Company, being a preferred example.

From about 1 to about 10 percent or higher, and preferably from 5 to 7.5 percent of the selected dye, based on weight of the fiber, is utilized. Various anionic and premetalized dyes may be used in the composition of this invention. Exemplary suitable dyes include Isolan yellow 3R CS, orange R CS, red 2G CS, Bordeaux R CS, blue FBN, black RL CS; Nylomine blue AG, red A2 BS, yellow AG; Alizarine Saffire 2G AL; Crocine Scarlet MOO, and others. The selected dye is dissolved in distilled, soft, or deionized water to avoid formation of precipitates with magnesium, calcium, or other elements normally found in water.

Light stabilizers may also be utilized to enhance lightfastness. Exemplary of such compositions are Tinuvin P, substituted hydroxyphenyl benzotriazole ultraviolet absorbers, available from Ciba Geigy, or Rylex H, available from E. I. duPont de Nemours and Company. These may optionally be used in concentrations of from about 0.1 to about 10 percent by weight of the fiber. These have been found most effective in anionic dyeing of esterified novoloid fibers.

While for purposes of experimental laboratory dyeing, the fiber or fabric may be added to the completely mixed dye bath, it will be understood that in commercial dyeing equipment, different procedural steps may be followed. Thus, the dye bath ingredients may be added directly to the fibers in the dyeing equipment, for example.

The invention is further illustrated by the following Examples, although it is to be understood that the Examples are intended for purposes of illustration only and are not intended to limit the scope of the invention.

EXAMPLE 1

A fiber sample comprising KYNOL$^{tm}$ fibers, a novoloid fiber available from The Carborundum Company, is subjected to scouring to remove all traces of sizing, lubricants, or soil accumulation. Scouring is carried out with a surface active agent such as soap or synthetic detergent. The undyed fiber is gold in color.

Merpol HCS surface active agent and tetrasodium pyrophosphate are added to distilled water at 27° C to form a 1 percent solution of each, based on weight of the bath. The fiber is added to the scouring bath, and the temperature raised to 88° C at a rate of 1.5° C per minute, and run at that temperature for 20 minutes. The bath is then cooled to 38° C, and the fiber is removed and thoroughly rinsed with warm water.

The dye bath is made up using 7.5 percent Isolan red 2G CS dye, based on fiber weight, with the bath ratio set at 30 cc/gram of fiber. The dye is added, with 0.4 grams/liter Merpol SE surface active agent, at 50° C while stirring. Then, 50 grams/liter of benzyl alcohol/acetophenone (80/20) are added, and the bath is run for 3 minutes to achieve uniformity. Ten ml/liter each of formic acid (90 percent) and acetic acid (56 percent) are added, the fibers are placed in the bath, and the bath temperature is raised to 127° C at a rate of 1.6° C/minute. The bath is run for 1.5 hours at 127° C, cooled to 50° C, and dropped. The fiber is then rinsed with warm water (50° to 60° C).

The dyed fibers are after-scoured to remove the carrier and other organic ingredients from the finished product by washing in a bath comprising one percent Merpol HCS and 0.5 percent acetic acid. The bath is set at 50° C, raised to 82° C at a rate of 1.5° C per minute, and run for 15 minutes. The fibers are then rinsed in 50° to 60° water, and dried. The resulting fibers are bright red, uniformly colored, and exhibit only slight fade after 20 hours under a xenon arc light.

EXAMPLE 2

A sample of an esterified novoloid fiber prepared in accordance with U.S. Pat. No. 3,716,521, is subjected to dyeing in accordance with the procedure and composition set forth in Example 1. The resultant dyed fiber is equally intensely colored, and exhibits similar brightness and lightfastness.

EXAMPLE 3

Fabric samples comprising KYNOL$^{tm}$ novoloid fiber and Nomex aramid fiber in a ratio of 80/20 are subjected to dyeing in accordance with the process of Example 1. Uniform colors are obtained using from 5 to 7.5 percent of the metallized dyes Isolan orange R CS, Isolan red 2G CS, Isolan black RL CS, and the anionic dyes Nylomine blue AG, Nylomine yellow AG, and Crocine scarlet MOO.

EXAMPLE 4

Samples of KYNOL$^{tm}$ novoloid fiber, and 80/20 blends of KYNOL$^{tm}$ novoloid fiber and Nomex aramid(polyamide) fiber are dyed in accordance with Example 1, and subjected to xenon arc light to test lightfastness. The results are set forth in Table I.

TABLE I

Hues and Lightfastness of KYNOL™ and KYNOL™/Nomex Fibers Dyed with Metallized Dyes

| Desired Hue | Dye | % Dye | Lightfastness (xenon-arc) 20 hours | 30 hours | Fade |
|---|---|---|---|---|---|
| YELLOW | Isolan yellow 3R CS | 7.5 | 4–5 | 3–4 | DW |
| ORANGE | Isolan orange R CS | 7.5 | 4–5 | 4–5 | W |
| ORANGE | Isolan red 2G CS | 7.5 | 5 | 4–5 | W |
| RED | Isolan red B 115% | 7.5 | 5 | 4–5 | W |
| RED | Isolan bordeaux R CS | 7.5 | 4–5 | 4 | W |
| DARK PURPLE | Isolan blue FBN 150% | 7.5 | 4 | 3 | W |
| BLACK | Isolan black RL CS | 7.5 | 4–5 | 4 | DW |
| DARK BROWN | Isolan dark brown RL Conc. | 7.5 | 4–5 | 4 | YW |

Key to Shade Change
5 - None
4 - Slight
3 - Noticeable
2 - Considerable
1 - Much Changed
B - Browner
D - Duller
R - Redder
W - Weaker
Y - Yellower

EXAMPLE 5

A sample of esterified novoloid fiber is dyed in accordance with Example 1, but using a light stabilizer. In this process the dye bath is made up without the dye itself, using two percent of the stabilizer based on weight of the fiber, Tinuvin P. The bath is run with the fiber for 30 minutes, and the anionic dye Crocine scarlet MOO is added, the bath run 90 minutes, and an additional two percent of the dye stabilizer is added. After running for an additional 30 minutes to enable the stabilizer to coat the dyed fiber, the bath is cooled, and the fiber is removed and rinsed thoroughly with warm water. The dyed fibers are found to be brightly dyed, and upon exposure to a xenon arc light for 40 hours exhibit no fading.

Percentages as set forth herein are based upon the following: fiber blends upon total weight of fiber; dye and stabilizer concentrations upon weight of fiber to be dyed; dye carrier, formic acid, and acetic acid upon volume of dye bath; and surface active agent upon weight of dye bath.

While the invention has been described herein with reference to certain preferred embodiments, it is to be understood that various changes and modifications may be made by those skilled in the art without departing from the concept of the invention, the scope of which is to be determined by reference to the following claims.

What is claimed is:

1. A composition for dyeing novoloid fibers, said composition comprising 1. from about 1 to about 10 percent anionic dye based upon fiber weight,
2. from about 3 to about 10 volume percent carrier medium selected from the group consisting of benzyl alcohol and benzyl alcohol/acetophenone,
3. from about 1 to about 10 volume percent formic acid,
4. from about 1 to about 5 volume percent acetic acid,
5. a small amount, less than 0.1 weight percent of surface active agent, and
6. water.

2. A composition as set forth in claim 1 wherein said dye is present in a concentration of from 5 to about 7.5 percent.

3. A composition as set forth in claim 2 wherein said carrier medium is benzyl alcohol.

4. A composition as set forth in claim 2 wherein said carrier medium is benzyl alcohol/acetophenone and said dye is a premetallized dye.

5. A composition as set forth in claim 1 wherein said formic acid is present in a concentration of from about 1 to about 5 volume percent, and said acetic acid is present in a concentration of from about 1 to about 2 volume percent.

6. A composition as set forth in claim 1 wherein said composition further comprises from about 0.1 to about 10 percent by weight of the fiber of a light stabilizer.

7. A dye bath comprising:

1. from 5 to 7.5 percent anionic dye, based on weight of fiber to be dyed;
2. from about 5 to about 6 volume percent of benzyl alcohol;
3. from about 1 to about 5 volume percent formic acid;
4. from about 1 to about 2 volume percent acetic acid;
5. a small amount, less than 0.1 weight percent of surface active agent, and
6. water.

8. A dye bath comprising:

1. from 5 to 7.5 percent premetallized dye, based on weight of fiber to be dyed;
2. from about 5 to about 6 volume percent benzyl alcohol/acetophenone;
3. from about 1 to about 5 volume percent formic acid;
4. from about 1 to about 2 volume percent acetic acid;
5. a small amount, less than 0.1 weight percent of surface active agent, and
6. water.

9. An anionic-dyed novoloid fiber.

10. An anionic-dyed infusible phenolic resin fiber having at least 50 percent of the phenolic hydroxyl groups blocked by esterification.

11. An anionic-dyed fiber comprising a novoloid resin and an aromatic polyamide.

12. A composition for dyeing novoloid fibers, said composition comprising, per liter, 1. from about ⅓ to about 3⅓ grams anionic dye;
2. from about 30 to about 100 milliliters carrier medium selected from the group consisting of benzyl alcohol and benzyl alcohol/acetophenone;
3. from about 10 to about 100 milliliters formic acid;
4. from about 10 to about 50 milliliters acetic acid;
5. a small amount, less than 0.1 weight percent of surface active agent, and
6. water.

13. A composition as set forth in claim 12 wherein said dye is present in a concentration of from 1⅔ to about 2½ grams per liter.

14. A composition as set forth in claim 13 wherein said carrier medium is benzyl alcohol.

15. A composition as set forth in claim 13 wherein said carrier medium is benzyl alcohol/acetophenone and said dye is a premetallized dye.

16. A composition as set forth in claim 12 wherein said formic acid is present in a concentration of from about 10 to about 50 milliliters per liter, and said acetic acid is present in a concentration of from about 10 to about 20 milliliters per liter.

17. A composition as set forth in claim 12 wherein said composition further comprises from about 1/30 to about 3⅓ grams, per liter, of a light stabilizer.

18. A dye bath comprising, per liter:

1. from 1⅔ to 2½ grams anionic dye;
2. from about 50 to about 60 milliliters of benzyl alcohol;
3. from about 10 to about 50 milliliters formic acid;
4. from about 10 to about 20 milliliters acetic acid;
5. a small amount, less than 0.1 weight percent of surface active agent, and
6. water.

19. A dye bath comprising, per liter:

1. from 1⅔ to 2½ grams premetallized dye;
2. from about 50 to about 60 milliliters volume percent benzyl alcohol/acetophenone;
3. from about 10 to about 50 milliliters formic acid;
4. from about 10 to about 20 milliliters acetic acid;
5. a small amount, less than 0.1 weight percent or surface active agent, and
6. water.

* * * * *